(12) United States Patent
Blackstock et al.

(10) Patent No.: US 11,229,849 B2
(45) Date of Patent: Jan. 25, 2022

(54) SYSTEM AND METHOD FOR GENERATING AND DISPLAYING AVATARS

(71) Applicant: Snap Inc., Santa Monica, CA (US)

(72) Inventors: Jacob Edward Blackstock, Toronto (CA); David James Kennedy, Toronto (CA); Shahan Panth, Toronto (CA); Dorian Franklin Baldwin, Toronto (CA)

(73) Assignee: Snap Inc., Santa Monica, CA (US)

( * ) Notice: Subject to any disclaimer, the term of this patent is extended or adjusted under 35 U.S.C. 154(b) by 490 days.

(21) Appl. No.: 15/401,926

(22) Filed: Jan. 9, 2017

(65) Prior Publication Data

US 2017/0113140 A1   Apr. 27, 2017

Related U.S. Application Data

(63) Continuation of application No. 13/979,974, filed as application No. PCT/CA2013/000454 on May 8, 2013, now Pat. No. 10,155,168.
(Continued)

(51) Int. Cl.
*A63F 13/79* (2014.01)
*A63F 13/35* (2014.01)
(Continued)

(52) U.S. Cl.
CPC .............. *A63F 13/79* (2014.09); *A63F 13/35* (2014.09); *A63F 13/537* (2014.09); *A63F 13/63* (2014.09); *G06N 3/006* (2013.01); *G06T 11/00* (2013.01); *A63F 2300/5553* (2013.01); *A63F 2300/6018* (2013.01)

(58) Field of Classification Search
CPC ........ A63F 13/79; A63F 13/35; A63F 13/537; A63F 13/63; A63F 2300/5553; A63F 2300/6018; G09N 3/006; G06T 11/00
See application file for complete search history.

(56) References Cited

U.S. PATENT DOCUMENTS

| | | |
|---|---|---|
| 5,880,731 A | 3/1999 | Liles et al. |
| 6,023,270 A | 2/2000 | Brush, II et al. |

(Continued)

FOREIGN PATENT DOCUMENTS

| | | |
|---|---|---|
| CA | 2887596 A1 | 7/2015 |
| CN | 109863532 A | 6/2019 |

(Continued)

OTHER PUBLICATIONS

"A Guide to Advertising on Campus With Snapchat Geofilters", College Marketing Group, [Online] Retrieved from the Internet: <URL: https://collegemarketinggroup.com/blog/a-guide-toadvertising-on-campus-with-snapchat-geofilters/>, (Jul. 25, 2016), 5 pgs.

(Continued)

*Primary Examiner* — Corbett B Coburn
(74) *Attorney, Agent, or Firm* — Schwegman Lundberg & Woessner, P.A.

(57) ABSTRACT

Among other things, embodiments of the present disclosure provide systems and methods for modifying avatar components of avatar datasets for multiple users, generating avatars based on the datasets, and displaying multiple avatars on a display screen of a graphical user interface.

19 Claims, 6 Drawing Sheets

Related U.S. Application Data

(60) Provisional application No. 61/644,057, filed on May 8, 2012.

(51) Int. Cl.
  *A63F 13/537* (2014.01)
  *A63F 13/63* (2014.01)
  *G06T 11/00* (2006.01)
  *G06N 3/00* (2006.01)

(56) References Cited

U.S. PATENT DOCUMENTS

| | | | |
|---|---|---|---|
| 6,038,295 | A | 3/2000 | Mattes |
| 6,223,165 | B1 | 4/2001 | Lauffer |
| 6,772,195 | B1 | 8/2004 | Hatlelid et al. |
| 6,842,779 | B1 | 1/2005 | Nishizawa |
| 6,980,909 | B2 | 12/2005 | Root et al. |
| 7,173,651 | B1 | 2/2007 | Knowles |
| 7,342,587 | B2 | 3/2008 | Danzig et al. |
| 7,411,493 | B2 | 8/2008 | Smith |
| 7,468,729 | B1 | 12/2008 | Levinson |
| 7,535,890 | B2 | 5/2009 | Rojas |
| 7,636,755 | B2 | 12/2009 | Blattner et al. |
| 7,639,251 | B2 | 12/2009 | Gu et al. |
| 7,775,885 | B2 | 8/2010 | Van Luchene et al. |
| 7,859,551 | B2 | 12/2010 | Bulman et al. |
| 7,885,931 | B2 | 2/2011 | Seo et al. |
| 7,925,703 | B2 | 4/2011 | Dinan et al. |
| 8,088,044 | B2 | 1/2012 | Tchao et al. |
| 8,095,878 | B2 | 1/2012 | Bates et al. |
| 8,108,774 | B2 | 1/2012 | Finn et al. |
| 8,117,281 | B2 | 2/2012 | Robinson et al. |
| 8,130,219 | B2 | 3/2012 | Fleury et al. |
| 8,131,597 | B2 | 3/2012 | Hudetz |
| 8,146,005 | B2 | 3/2012 | Jones et al. |
| 8,151,191 | B2 | 4/2012 | Nicol |
| 8,199,747 | B2 | 6/2012 | Rojas et al. |
| 8,332,475 | B2 | 12/2012 | Rosen et al. |
| 8,384,719 | B2 | 2/2013 | Reville et al. |
| RE44,054 | E | 3/2013 | Kim |
| 8,396,708 | B2 | 3/2013 | Park et al. |
| 8,425,322 | B2 | 4/2013 | Gillo et al. |
| 8,458,601 | B2 | 6/2013 | Castelli et al. |
| 8,462,198 | B2 | 6/2013 | Lin et al. |
| 8,484,158 | B2 | 7/2013 | Deluca et al. |
| 8,495,503 | B2 | 7/2013 | Brown et al. |
| 8,495,505 | B2 | 7/2013 | Smith et al. |
| 8,504,926 | B2 | 8/2013 | Wolf |
| 8,559,980 | B2 | 10/2013 | Pujol |
| 8,564,621 | B2 | 10/2013 | Branson et al. |
| 8,564,710 | B2 | 10/2013 | Nonaka et al. |
| 8,581,911 | B2 | 11/2013 | Becker et al. |
| 8,597,121 | B2 | 12/2013 | Andres Del |
| 8,601,051 | B2 | 12/2013 | Wang |
| 8,601,379 | B2 | 12/2013 | Marks et al. |
| 8,632,408 | B2 | 1/2014 | Gillo et al. |
| 8,648,865 | B2 | 2/2014 | Dawson et al. |
| 8,659,548 | B2 | 2/2014 | Hildreth |
| 8,683,354 | B2 | 3/2014 | Khandelwal et al. |
| 8,692,830 | B2 | 4/2014 | Nelson et al. |
| 8,718,333 | B2 | 5/2014 | Wolf et al. |
| 8,724,622 | B2 | 5/2014 | Rojas |
| 8,810,513 | B2 | 8/2014 | Ptucha et al. |
| 8,812,171 | B2 | 8/2014 | Filev et al. |
| 8,832,201 | B2 | 9/2014 | Wall |
| 8,832,552 | B2 | 9/2014 | Arrasvuori et al. |
| 8,839,327 | B2 | 9/2014 | Amento et al. |
| 8,874,677 | B2 | 10/2014 | Rosen et al. |
| 8,890,926 | B2 | 11/2014 | Tandon et al. |
| 8,892,999 | B2 | 11/2014 | Nims et al. |
| 8,909,679 | B2 | 12/2014 | Roote et al. |
| 8,924,250 | B2 | 12/2014 | Bates et al. |
| 8,935,656 | B2 | 1/2015 | Dandia et al. |
| 8,963,926 | B2 | 2/2015 | Brown et al. |
| 8,989,786 | B2 | 3/2015 | Feghali |
| 8,995,433 | B2 | 3/2015 | Rojas |
| 9,040,574 | B2 | 5/2015 | Wang et al. |
| 9,055,416 | B2 | 6/2015 | Rosen et al. |
| 9,086,776 | B2 | 7/2015 | Ye et al. |
| 9,100,806 | B2 | 8/2015 | Rosen et al. |
| 9,100,807 | B2 | 8/2015 | Rosen et al. |
| 9,105,014 | B2 | 8/2015 | Collet et al. |
| 9,191,776 | B2 | 11/2015 | Root et al. |
| 9,204,252 | B2 | 12/2015 | Root |
| 9,241,184 | B2 | 1/2016 | Weerasinghe |
| 9,256,860 | B2 | 2/2016 | Herger et al. |
| 9,298,257 | B2 | 3/2016 | Hwang et al. |
| 9,314,692 | B2 | 4/2016 | Konoplev et al. |
| 9,330,483 | B2 | 5/2016 | Du et al. |
| 9,357,174 | B2 | 5/2016 | Li et al. |
| 9,361,510 | B2 | 6/2016 | Yao et al. |
| 9,378,576 | B2 | 6/2016 | Bouaziz et al. |
| 9,402,057 | B2 | 7/2016 | Kaytaz et al. |
| 9,412,192 | B2 | 8/2016 | Mandel et al. |
| 9,443,227 | B2 | 9/2016 | Evans et al. |
| 9,460,541 | B2 | 10/2016 | Li et al. |
| 9,480,924 | B2 * | 11/2016 | Haslam ............... A63F 13/63 |
| 9,489,661 | B2 | 11/2016 | Evans et al. |
| 9,489,760 | B2 | 11/2016 | Li et al. |
| 9,491,134 | B2 | 11/2016 | Rosen et al. |
| 9,503,845 | B2 | 11/2016 | Vincent |
| 9,508,197 | B2 | 11/2016 | Quinn et al. |
| 9,544,257 | B2 | 1/2017 | Ogundokun et al. |
| 9,576,400 | B2 | 2/2017 | Van Os et al. |
| 9,589,357 | B2 | 3/2017 | Li et al. |
| 9,592,449 | B2 | 3/2017 | Barbalet et al. |
| 9,641,870 | B1 | 5/2017 | Cormie et al. |
| 9,648,376 | B2 | 5/2017 | Chang et al. |
| 9,697,635 | B2 | 7/2017 | Quinn et al. |
| 9,706,040 | B2 | 7/2017 | Kadirvel et al. |
| 9,744,466 | B2 | 8/2017 | Fujioka |
| 9,746,990 | B2 | 8/2017 | Anderson et al. |
| 9,749,270 | B2 | 8/2017 | Collet et al. |
| 9,792,714 | B2 | 10/2017 | Li et al. |
| 9,839,844 | B2 | 12/2017 | Dunstan et al. |
| 9,883,838 | B2 | 2/2018 | Kaleal, III et al. |
| 9,898,849 | B2 | 2/2018 | Du et al. |
| 9,911,073 | B1 | 3/2018 | Spiegel et al. |
| 9,936,165 | B2 | 4/2018 | Li et al. |
| 9,959,037 | B2 | 5/2018 | Chaudhri et al. |
| 9,980,100 | B1 | 5/2018 | Charlton et al. |
| 9,990,373 | B2 | 6/2018 | Fortkort |
| 10,039,988 | B2 | 8/2018 | Lobb et al. |
| 10,097,492 | B2 | 10/2018 | Tsuda et al. |
| 10,116,598 | B2 | 10/2018 | Tucker et al. |
| 10,155,168 | B2 | 12/2018 | Blackstock et al. |
| 10,242,477 | B1 | 3/2019 | Charlton et al. |
| 10,242,503 | B2 | 3/2019 | McPhee et al. |
| 10,262,250 | B1 | 4/2019 | Spiegel et al. |
| 10,362,219 | B2 | 7/2019 | Wilson et al. |
| 10,432,559 | B2 | 10/2019 | Baldwin et al. |
| 10,475,225 | B2 | 11/2019 | Park et al. |
| 10,504,266 | B2 | 12/2019 | Blattner et al. |
| 10,573,048 | B2 | 2/2020 | Ni et al. |
| 10,657,701 | B2 | 5/2020 | Osman et al. |
| 10,880,246 | B2 | 12/2020 | Baldwin et al. |
| 10,938,758 | B2 | 3/2021 | Allen et al. |
| 2002/0067362 | A1 | 6/2002 | Agostino Nocera et al. |
| 2002/0169644 | A1 | 11/2002 | Greene |
| 2005/0162419 | A1 | 7/2005 | Kim et al. |
| 2005/0206610 | A1 | 9/2005 | Cordelli |
| 2005/0280660 | A1 | 12/2005 | Seo et al. |
| 2006/0294465 | A1 | 12/2006 | Ronen et al. |
| 2007/0113181 | A1 | 5/2007 | Blattner et al. |
| 2007/0168863 | A1 | 7/2007 | Blattner et al. |
| 2007/0176921 | A1 | 8/2007 | Iwasaki et al. |
| 2007/0218987 | A1 | 9/2007 | Luchene et al. |
| 2007/0260984 | A1 * | 11/2007 | Marks .................... A63F 13/06 |
| | | | 715/706 |
| 2008/0158222 | A1 | 7/2008 | Li et al. |
| 2008/0201638 | A1 | 8/2008 | Nair |
| 2009/0016617 | A1 | 1/2009 | Bregman-amitai et al. |
| 2009/0055484 | A1 | 2/2009 | Vuong et al. |

(56) References Cited

U.S. PATENT DOCUMENTS

| | | |
|---|---|---|
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0144639 A1 | 6/2009 | Nims et al. |
| 2009/0150778 A1 | 6/2009 | Nicol |
| 2009/0158170 A1 | 6/2009 | Narayanan et al. |
| 2009/0177976 A1 | 7/2009 | Bokor et al. |
| 2009/0202114 A1 | 8/2009 | Morin et al. |
| 2009/0254859 A1* | 10/2009 | Arrasvuori ............ G06Q 10/10 715/810 |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2009/0319178 A1 | 12/2009 | Khosravy et al. |
| 2009/0328122 A1 | 12/2009 | Amento et al. |
| 2010/0011422 A1 | 1/2010 | Mason et al. |
| 2010/0023885 A1* | 1/2010 | Reville ................. A63F 13/12 715/764 |
| 2010/0083140 A1 | 4/2010 | Dawson et al. |
| 2010/0100828 A1 | 4/2010 | Khandelwal et al. |
| 2010/0115426 A1 | 5/2010 | Liu et al. |
| 2010/0121915 A1 | 5/2010 | Wang |
| 2010/0162149 A1 | 6/2010 | Sheleheda et al. |
| 2010/0197396 A1* | 8/2010 | Fujii ..................... A63F 13/79 463/31 |
| 2010/0203968 A1 | 8/2010 | Gill et al. |
| 2010/0227682 A1 | 9/2010 | Reville et al. |
| 2010/0290756 A1 | 11/2010 | Karaoguz et al. |
| 2010/0332980 A1 | 12/2010 | Sun et al. |
| 2011/0093780 A1 | 4/2011 | Dunn |
| 2011/0115798 A1 | 5/2011 | Nayar et al. |
| 2011/0148864 A1 | 6/2011 | Lee et al. |
| 2011/0202598 A1 | 8/2011 | Evans et al. |
| 2011/0239136 A1 | 9/2011 | Goldman et al. |
| 2011/0239143 A1 | 9/2011 | Ye et al. |
| 2011/0248992 A1* | 10/2011 | van Os ................. G06T 11/60 345/419 |
| 2012/0013770 A1 | 1/2012 | Stafford et al. |
| 2012/0113106 A1 | 5/2012 | Choi et al. |
| 2012/0124458 A1 | 5/2012 | Cruzada |
| 2012/0130717 A1 | 5/2012 | Xu et al. |
| 2012/0209924 A1 | 8/2012 | Evans et al. |
| 2012/0215879 A1* | 8/2012 | Bozo .................... G06F 3/0481 709/217 |
| 2012/0223940 A1* | 9/2012 | Dunstan ............... G06T 13/80 345/419 |
| 2013/0103760 A1 | 4/2013 | Golding et al. |
| 2013/0152000 A1 | 6/2013 | Liu et al. |
| 2013/0155169 A1 | 6/2013 | Hoover et al. |
| 2013/0201187 A1 | 8/2013 | Tong et al. |
| 2013/0249948 A1 | 9/2013 | Reitan |
| 2013/0257877 A1 | 10/2013 | Davis |
| 2014/0011576 A1 | 1/2014 | Barbalet et al. |
| 2014/0040066 A1* | 2/2014 | Fujioka ................ A63F 13/12 705/26.5 |
| 2014/0043329 A1 | 2/2014 | Wang et al. |
| 2014/0055554 A1 | 2/2014 | Du et al. |
| 2014/0125678 A1 | 5/2014 | Wang et al. |
| 2014/0128166 A1* | 5/2014 | Tam ..................... A63F 13/46 463/42 |
| 2014/0129343 A1 | 5/2014 | Finster et al. |
| 2014/0160149 A1 | 6/2014 | Blackstock et al. |
| 2015/0121251 A1 | 4/2015 | Kadirvel |
| 2015/0206349 A1 | 7/2015 | Rosenthal et al. |
| 2016/0045834 A1 | 2/2016 | Burns |
| 2016/0134840 A1 | 5/2016 | Mcculloch |
| 2016/0234149 A1 | 8/2016 | Tsuda et al. |
| 2017/0006322 A1 | 1/2017 | Dury et al. |
| 2017/0080346 A1 | 3/2017 | Abbas |
| 2017/0087473 A1 | 3/2017 | Siegel et al. |
| 2017/0118145 A1 | 4/2017 | Aittoniemi et al. |
| 2017/0199855 A1 | 7/2017 | Fishbeck |
| 2017/0235848 A1 | 8/2017 | Van Deusen et al. |
| 2017/0310934 A1 | 10/2017 | Du et al. |
| 2017/0312634 A1 | 11/2017 | Ledoux et al. |
| 2018/0047200 A1 | 2/2018 | O'hara et al. |
| 2018/0113587 A1 | 4/2018 | Allen et al. |
| 2018/0115503 A1 | 4/2018 | Baldwin et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2019/0001223 A1* | 1/2019 | Blackstock ............ G06N 3/006 |
| 2019/0057616 A1* | 2/2019 | Cohen .................. G09B 5/06 |
| 2019/0188920 A1 | 6/2019 | Mcphee et al. |
| 2019/0386941 A1 | 12/2019 | Baldwin et al. |
| 2021/0152505 A1 | 5/2021 | Baldwin et al. |
| 2021/0266277 A1 | 8/2021 | Allen et al. |

FOREIGN PATENT DOCUMENTS

| | | |
|---|---|---|
| CN | 110023985 A | 7/2019 |
| CN | 110168478 A | 8/2019 |
| EP | 2184092 A2 | 5/2010 |
| JP | 2001230801 A | 8/2001 |
| JP | 2014006881 A | 1/2014 |
| JP | 5497931 B2 | 3/2014 |
| KR | 1020050036963 A | 4/2005 |
| KR | 20070008417 A | 1/2007 |
| KR | 101445263 B1 | 9/2014 |
| KR | 20160016532 A | 2/2016 |
| KR | 20160028028 A | 3/2016 |
| KR | 20160051536 A | 5/2016 |
| KR | 102233700 B1 | 3/2021 |
| WO | WO-2003094072 A1 | 11/2003 |
| WO | WO-2004095308 A1 | 11/2004 |
| WO | WO-2006107182 A1 | 10/2006 |
| WO | WO-2007134402 A1 | 11/2007 |
| WO | WO-2012139276 A1 | 10/2012 |
| WO | WO-2013027893 A1 | 2/2013 |
| WO | WO-2013152454 A1 | 10/2013 |
| WO | WO-2013166588 A1 | 11/2013 |
| WO | WO-2014031899 A1 | 2/2014 |
| WO | WO-2014194439 A1 | 12/2014 |
| WO | WO-2016090605 A1 | 6/2016 |
| WO | WO-2018081013 A1 | 5/2018 |
| WO | WO-2018102562 A1 | 6/2018 |
| WO | WO-2018129531 A1 | 7/2018 |
| WO | WO-2019089613 A1 | 5/2019 |

OTHER PUBLICATIONS

"U.S. Appl. No. 15/369,499, Final Office Action dated Oct. 1, 2019", 17 pgs.

"U.S. Appl. No. 15/369,499, Non Final Office Action dated Jun. 17, 2019", 17 pgs.

"U.S. Appl. No. 15/369,499, Response filed Sep. 10, 2019 to Non-Final Office Action dated Jun. 17, 2019", 9 pgs.

"U.S. Appl. No. 16/115,259, Non Final Office Action dated Jul. 30, 2019", 21 pgs.

"U.S. Appl. No. 16/115,259, Response filed Oct. 30, 2019 to Non Final Office Action dated Jul. 30, 2019", 9 pgs.

"European Application Serial No. 17876226.6, Extended European Search Report dated Sep. 5, 2019", 10 pgs.

"International Application Serial No. PCT/US2017/063981, International Preliminary Report on Patentability dated Jun. 13, 2019", 10 pgs.

Alex, Heath, "What do Snapchat's emojis mean?—Understanding these emojis will turn you into a Snapchat pro", Business Insider, [Online] Retrieved from the Internet: <URL: https://www.businessinsider.com/what-do-snapchats-emojismean-2016-5?international=true&r=US&IR=T>, (May 28, 2016), 1 pg.

Karen, Tumbokon, "Snapchat Update: How to Add Bitmoji to customizable Geofilters", International Business Times, [Online] Retrieved from the Internet: <URL: https://www.ibtimes.com/snapchat-update-how-add-bitmojicustornizable-geofilters-2448152>, (Nov. 18, 2016), 6 pgs.

Sophia, Bernazzani, "A Brief History of Snapchat", Hubspot, [Online] Retrieved from the Internet: <URL: https://blog.hubspot.com/marketing/history-of-snapchat>, (Feb. 10, 2017), 12 pgs.

(56) References Cited

OTHER PUBLICATIONS

"U.S. Appl. No. 15/369,499, Response filed Feb. 3, 2020 to Final Office Action dated Oct. 1, 2019", 10 pgs.
"U.S. Appl. No. 16/115,259, Final Office Action dated Dec. 16, 2019", 23 pgs.
"U.S. Appl. No. 16/126,869, Non Final Office Action dated Feb. 5, 2020", 7 pgs.
"U.S. Appl. No. 15/369,499, Non Final Office Action dated Mar. 2, 2020", 17 pgs.
"U.S. Appl. No. 16/115,259, Response filed Mar. 13, 2020 to Final Office Action dated Dec. 16, 2019".
"U.S. Appl. No. 15/369,499, Final Office Action dated Jun. 15, 2020", 17 pgs.
"U.S. Appl. No. 15/369,499, Response filed Jun. 2, 2020 to Non Final Office Action dated Mar. 2, 2020", 9 pgs.
"U.S. Appl. No. 16/115,259, Final Office Action dated Jul. 22, 2020", 20 pgs.
"U.S. Appl. No. 16/115,259, Non Final Office Action dated Apr. 9, 2020", 18 pgs.
"U.S. Appl. No. 16/115,259, Response filed Jul. 9, 2020 to Non Final Office Action dated Apr. 9, 2020".
"U.S. Appl. No. 16/126,869, Final Office Action dated Jul. 7, 2020", 8 pgs.
"U.S. Appl. No. 16/126,869, Response filed May 5, 2020 to Non Final Office Action dated Feb. 5, 2020", 8 pgs.
"European Application Serial No. 17876226.6, Communication Pursuant to Article 94(3) EPC dated May 29, 2020", 5 pgs.
"European Application Serial No. 17876226.6, Response filed Mar. 30, 2020 to Extended European Search Report dated Sep. 5, 2019", 22 pgs.
"Korean Application Serial No. 10-2019-7018501, Notice of Preliminary Rejection dated Apr. 16, 2020", w/ English Translation, 20 pgs.
"Korean Application Serial No. 10-2019-7018501, Response filed Jun. 16, 2020 to Notice of Preliminary Rejection dated Apr. 16, 2020", w/ English Claims, 17 pgs.
"U.S. Appl. No. 15/369,499, Examiner Interview Summary dated Sep. 21, 2020", 3 pgs.
"U.S. Appl. No. 15/369,499, Examiner Interview Summary dated Oct. 9, 2020", 2 pgs.
"U.S. Appl. No. 15/369,499, Notice of Allowance dated Oct. 26, 2020", 17 pgs.
"U.S. Appl. No. 15/369,499, Response filed Sep. 15, 2020 to Final Office Action dated Jun. 15, 2020", 10 pgs.
"U.S. Appl. No. 16/115,259, Non Final Office Action dated Jan. 11, 2021", 17 pgs.
"U.S. Appl. No. 16/115,259, Response filed Oct. 22, 2020 to Final Office Action dated Jul. 22, 2020", 10 pgs.
"U.S. Appl. No. 16/126,869, Non Final Office Action dated Oct. 30, 2020", 9 pgs.
"U.S. Appl. No. 16/126,869, Response filed Oct. 7, 2020 to Final Office Action dated Jul. 7, 2020", 10 pgs.
"U.S. Appl. No. 16/552,003, Notice of Allowance datd Aug. 27, 2020", 15 pgs.
"European Application Serial No. 17876226.6, Response filed Oct. 2, 2020 to Communication Pursuant to Article 94(3) EPC dated May 29, 2020", 22 pgs.
"Korean Application Serial No. 10-2019-7018501, Final Office Action dated Sep. 8, 2020", w/ English translation, 9 pgs.
"Korean Application Serial No. 10-2019-7018501, Response filed Dec. 7, 2020 to Final Office Action dated Sep. 8, 2020", w/ English Claims, 26 pgs.
"U.S. Appl. No. 16/126,869, Response filed May 10, 2021 to Final Office Action dated Feb. 8, 2021 ", 10 pgs.
"U.S. Appl. No. 16/115,259, Response filed May 11, 2021 to Non Final Office Action dated Jan. 11, 2021", 14 pgs.
U.S. Appl. No. 16/552,003, filed Aug. 27, 2019, Generating and Displaying Customized Avatars in Electronic Messages.

"Korean Application Serial No. 10-2020-7035136, Notice of Preliminary Rejection dated Feb. 25, 2021", w/ English Translation, 5 pgs.
"U.S. Appl. No. 16/115,259, Preliminary Amendment filed Oct. 18, 2018 t", 6 pgs.
"U.S. Appl. No. 15/369,499, Response filed Nov. 15, 2018 to Non Final Office Action dated Aug. 15, 2018", 10 pgs.
"U.S. Appl. No. 13/979,974, Corrected Notice of Allowability dated Nov. 19, 2018", 2 pgs.
"U.S. Appl. No. 15/365,046, Non Final Office Action dated Dec. 20, 2018", 36 pgs.
U.S. Appl. No. 16/126,869, filed Sep. 10, 2018, System and Method for Generating and Displaying Avatars.
U.S. Appl. No. 16/115,259, filed Aug. 28, 2018, Generating and Displaying Customized Avatars in Media Overlays.
"U.S. Appl. No. 15/365,046, Notice of Allowance dated May 21, 2019", 14 pgs.
"U.S. Appl. No. 15/369,499, Final Office Action dated Jan. 31, 2019", 22 pgs.
"U.S. Appl. No. 15/369,499, Response filed Mar. 14, 2019 to Final Office Action dated Jan. 31, 2019", 12 pgs.
"U.S. Appl. No. 15/365,046, Response filed Mar. 20, 2019 to Non Final Office Action dated Dec. 20, 2018", 20 pgs.
U.S. Appl. No. 13/979,974, filed Jul. 16, 2013, System and Method for Adaptable Avatars.
U.S. Appl. No. 15/365,046, filed Nov. 30, 2016, Generating and Displaying Customized Avatars in Electronic Messages.
U.S. Appl. No. 15/369,499, filed Dec. 5, 2016, Generating and Displaying Customized Avatars in Media Overlays.
"U.S. Appl. No. 13/979,974, Final Office Action dated Apr. 25, 2018", 18 pgs.
"U.S. Appl. No. 13/979,974, Notice of Allowance dated Aug. 10, 2018", 9 pgs.
"U.S. Appl. No. 13/979,974, Response filed Jan. 30, 2018 to Non Final Office Action dated Oct. 3, 2017", 8 pgs.
"U.S. Appl. No. 13/979,974, Response filed Jul. 25, 2018 to Final Office Action dated Apr. 25, 2018", 10 pgs.
"U.S. Appl. No. 15/369,499, Non Final Office Action dated Aug. 15, 2018", 22 pgs.
"International Application Serial No. PCT/US2017/063981, International Search Report dated Mar. 22, 2018", 3 pgs.
"International Application Serial No. PCT/US2017/063981, Written Opinion dated Mar. 22, 2018", 8 pgs.
"U.S. Appl. No. 13/979,974, Examiner Interview Summary dated Jun. 29, 2017", 3 pgs.
"U.S. Appl. No. 13/979,974, Examiner Interview Summary dated Sep. 15, 2017", 3 pgs.
"U.S. Appl. No. 13/979,974, Final Office Action dated Jun. 9, 2017", 20 pgs.
"U.S. Appl. No. 13/979,974, Final Office Action dated Oct. 12, 2016", 13 pgs.
"U.S. Appl. No. 13/979,974, Non Final Office Action dated Feb. 22, 2017", 17 pgs.
"U.S. Appl. No. 13/979,974, Non Final Office Action dated Apr. 27, 2016", 16 pgs.
"U.S. Appl. No. 13/979,974, Non Final Office Action dated Oct. 3, 2017", 17 pgs.
"U.S. Appl. No. 13/979,974, Response filed May 22, 2017 to Non Final Office Action dated Feb. 22, 2017", 10 pgs.
"U.S. Appl. No. 13/979,974, Response filed Jul. 26, 2016 to Non Final Office Action dated Apr. 27, 2016", 8 pgs.
"U.S. Appl. No. 13/979,974, Response filed Sep. 11, 2017 to Final Office Action dated Jun. 9, 2017", 8 pgs.
"U.S. Appl. No. 13/979,974, Response filed Jan. 12, 2017 to Non Final Office Action dated Apr. 27, 2016", 8 pgs.
"International Application Serial No. PCT/CA2013/000454, International Preliminary Report on Patentability dated Nov. 20, 2014", 9 pgs.
"International Application Serial No. PCT/CA2013/000454, International Search Report dated Aug. 20, 2013", 3 pgs.
"International Application Serial No. PCT/CA2013/000454, Written Opinion dated Aug. 20, 2013", 7 pgs.

(56) References Cited

OTHER PUBLICATIONS

Leyden, John, "This SMS will self-destruct in 40 seconds", [Online]. Retrieved from the Internet: <URL: http://www.theregister.co.uk/2005/12/12/stealthtext/, (Dec. 12, 2005), 1 pg.

"U.S. Appl. No. 15/369,499, Corrected Notice of Allowability dated Jan. 28, 2021", 3 pgs.

"U.S. Appl. No. 16/126,869, Final Office Action dated Feb. 8, 2021", 8 pgs.

"U.S. Appl. No. 16/126,869, Response filed Feb. 1, 2021 to Non Final Office Action dated Oct. 30, 2020", 9 pgs.

"U.S. Appl. No. 17/247,169, Preliminary Amendment filed Feb. 2, 2021", 7 pgs.

"U.S. Appl. No. 16/126,869, Non Final Office Action dated May 19, 2021", 8 pgs.

"U.S. Appl. No. 16/115,259, Final Office Action dated Jul. 13, 2021", 18 pgs.

"U.S. Appl. No. 16/126,869, Response filed Aug. 19, 21 to Non Final Office Action dated May 19, 2021", 10 pgs.

"U.S. Appl. No. 17/247,169, Corrected Notice of Allowability dated Jul. 9, 2021", 2 pgs.

"U.S. Appl. No. 17/247,169, Notice of Allowance dated Jul. 2, 2021", 14 pgs.

"U.S. Appl. No. 16/115,259, Non-Final Office Action dated Nov. 8, 2021", 17 pgs.

"U.S. Appl. No. 16/115,259, Response filed Oct. 13, 2021 to Final Office Action dated Jul. 13, 2021", 10 pgs.

"U.S. Appl. No. 16/126,869, Final Office Action dated Nov. 29, 2021", 9 pgs.

"U.S. Appl. No. 17/247,169, Corrected Notice of Allowability dated Oct. 15, 2021", 7 pgs.

"U.S. Appl. No. 17/247,169, Corrected Notice of Allowability dated Nov. 30, 2021", 2 pgs.

\* cited by examiner

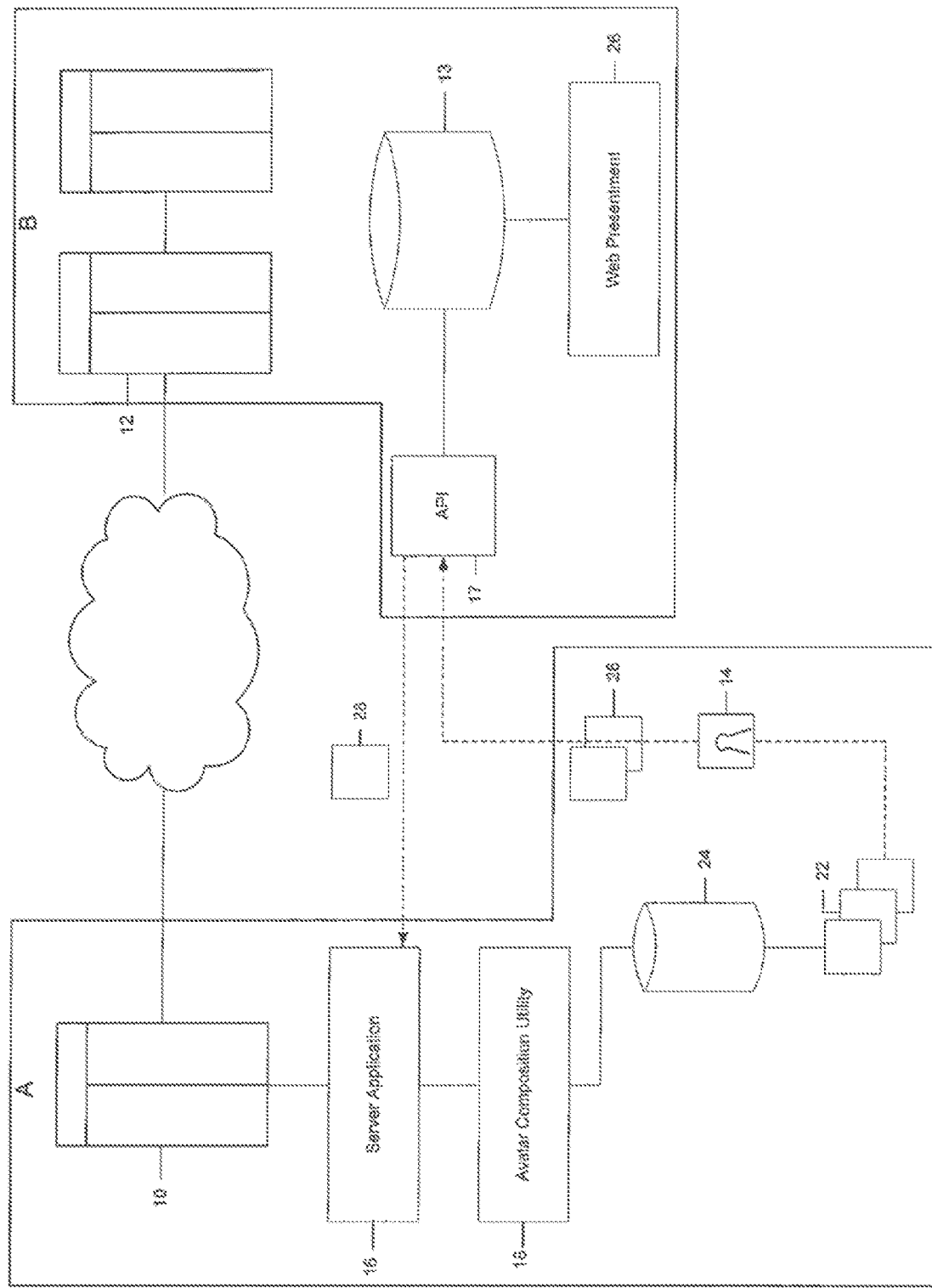

| | File | ID | Category name | Category type | Gender | Sub_category_1 | Sub_category_2 | State_1 | State_2 |
|---|---|---|---|---|---|---|---|---|---|
| Hairstyle | [image] | hairstyle_1 | hairstyle | 1 | 2 | hair_short | hair_straight | | |
| | [image] | hairstyle_2 | hairstyle | 1 | 2 | hair_short | hair_straight | | |
| | [image] | hairstyle_3 | hairstyle | 1 | 2 | hair_medium | hair_wavy | | |
| Eyes | [image] | eyes_1 | eyes | 1 | 0 | round | | eyes_open | eyes_happy |
| | [image] | eyes_2 | eyes | 1 | 0 | round | | eyes_closed | eyes_sad |
| | [image] | eyes_1 | eyes | 1 | 0 | round | | eyes_squinting | eyes_mad |
| Noses | [image] | nose_1 | nose | 1 | 2 | nose_straight | | | |
| | [image] | nose_2 | nose | 1 | 2 | nose_straight | | | |
| | [image] | nose_3 | nose | 1 | 2 | nose_round | | | |
| Jaws | [image] | jaw_1 | jaw | 1 | 2 | | | | |
| | [image] | jaw_2 | jaw | 1 | 2 | | | | |
| | [image] | jaw_3 | jaw | 1 | 2 | | | | |
| Mouth | [image] | mouth_1 | mouth | 1 | 0 | lips_none | | mouth_closed | mouth_neutral |
| | [image] | mouth_1 | mouth | 1 | 0 | lips_none | | mouth_open | mouth_smiling |
| | [image] | mouth_1 | mouth | 1 | 0 | lips_none | | mouth_open_white | mouth_frowning |
| Headwear | [image] | headwear_1 | headwear | 2 | 0 | | | | |
| | [image] | headwear_2 | headwear | 2 | 0 | | | | |
| | [image] | headwear_3 | headwear | 2 | 0 | | | | |
| Height | [image] | body_1 | body_height | 1 | | | | | |
| | [image] | body_2 | body_height | 3 | | | | | |
| | [image] | body_3 | body_height | 1 | | | | | |

Fig. 2

SYSTEM AND METHOD FOR GENERATING AND DISPLAYING AVATARS

CROSS REFERENCE TO RELATED APPLICATIONS

This application is a continuation of, and claims priority to, U.S. patent application Ser. No. 13/979,974, filed May 8, 2013 and entitled "SYSTEM AND METHOD FOR ADAPTABLE AVATARS," which is a U.S. National Stage Application filed Under § 371 from International Application Serial No. PCT/CA2013/000454, filed May 8, 2013, entitled "SYSTEM AND METHOD FOR GENERATING AND DISPLAYING AVATARS," which in turn claims priority to U.S. Provisional Patent Application Ser. No. 61/644,057, filed May 2012, and entitled "SYSTEM AND METHOD FOR ADAPTABLE AVATARS," the contents of which are incorporated herein by reference in their entirety.

FIELD OF THE INVENTION

The present invention relates generally to providing user representations in computing environments. The present invention further relates to managing a particular user's representation in avatar form in computing environments.

BACKGROUND OF THE INVENTION

Environments that use avatars to represent users typically provide their own avatar creation tools. An avatar created by a user in one online environment is usually confined to that environment, so for each new environment, the user typically must create a separate, different avatar. To update characteristics of multiple avatars, the user must change each avatar separately within each environment, which can be time consuming.

Despite the apparent inefficiency of such a system, having a multiplicity of avatars may serve a practical purpose. Just as in real life, digital users exist in multiple contexts and may require different identities in different environments; for example, one identity for work, another for family and friends, another for video games, others for interests and hobbies, and so on. A different avatar in each situation allows the user to present a contextually relevant appearance.

Nevertheless, as the number of digital environments grows, the user is compelled to create and manage an ever-increasing number of avatars, which creates a disincentive to design a separate avatar for each new environment. This reduces the value of avatars generally, and for environments that use avatars, adds a barrier to adoption.

There are mechanisms that attempt to solve this problem by enabling users to use the same avatar in multiple environments, such as one disclosed by Mason et al. in U.S. patent application Ser. No. 12/279,643 (published as US 2010/0011422 A1).

However, such mechanisms require an avatar to be rendered identically in each environment, and therefore fail to provide the avatar's fundamental benefits, which include giving the user a contextually relevant identity, and each environment a consistent look and feel.

Therefore, what is needed is a solution to address at least some of these limitations.

SUMMARY OF THE INVENTION

In accordance with an aspect of the present invention, the present disclosure relates to a system and method for providing avatars adaptable to multiple environments. Avatar means any representation of a user, which may be manifested visually in an environment. For example, an avatar may be manifested as a character in a video game, a user profile picture in a social networking website, or an emoticon in a messaging application, etc. Environment in this disclosure broadly means any environment where an avatar may be manifested. For example, an environment may be an avatar creation application, video game, social networking website, messaging application, smartphone address book, or any other application where a user may want to have a representation.

In accordance with an aspect of the present invention, more particularly, the system and method provides data about an avatar's components, such as discrete facial and bodily features, and the relative positions of the features to another, for the purpose of rendering different versions of a user's avatar which may be visually adapted to suit multiple environments.

In accordance with an aspect of the present invention, the system and method enables data about a single avatar to be adapted and re-rendered in multiple environments in a virtually unlimited number of ways. This allows service providers (such as operators of a service environment) to reap the benefits of providing avatars designed to visually match their environments, while relieving the user of the need to create a new avatar specifically for each service. The user can instead create an avatar in one environment, and link the avatar data to a user account in a second environment. The avatar can then be automatically re-rendered with the second environment's art set using avatar data from the first environment. The second environment can therefore choose not to offer an avatar creation tool at all, yet still give the user the full experience of interacting in its environment with a relevant and personalized avatar.

In accordance with an aspect of the present invention, there is provided a method comprising: a first computing device maintaining avatar data describing at least one avatar component of a first avatar designed for a first service environment, the avatar data associated with an identifier; the first computing device receiving a request from a second service environment, the request including identification data and at least one requested avatar component; based at least partly on a correspondence between the respective identifier and the received identification data, the first computing device transmitting to the second service environment the avatar data describing the at least one avatar component corresponding to the at least one requested avatar component type; and the second service environment generating a second avatar for a second service environment based at least partly on the avatar data received from the first computing device.

In accordance with an aspect of the present invention, in this respect, before explaining at least one embodiment of the invention in detail, it is to be understood that the invention is not limited in its application to the details of construction and to the arrangements of the components set forth in the following description or the examples provided therein, or illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

In the drawings, embodiments of the invention are illustrated by way of example. It is to be expressly understood that the description and drawings are only for the purpose of illustration and as an aid to understanding, and are not intended as a definition of the limits of the invention.

FIG. 1 illustrates an example of a computer network implementation of the system of the present invention.

FIG. 2 is a table showing an example of avatar data in accordance with the present invention.

DETAILED DESCRIPTION

Figure 3A:
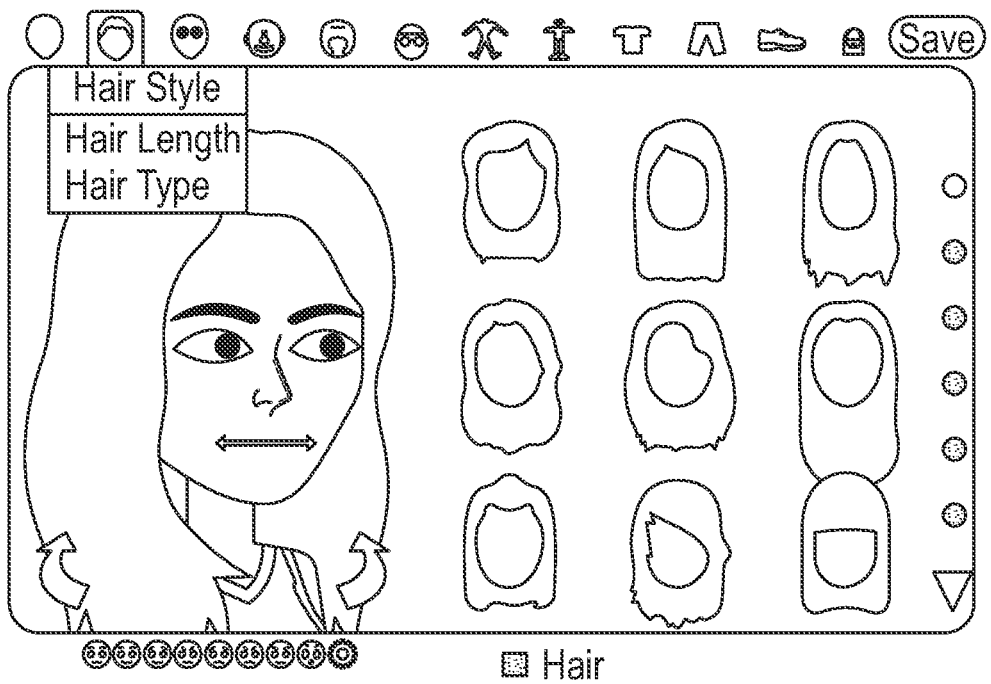
FIGS. 3a, 3b, 3c, and 3d show examples of an avatar composition utility.

As noted above, the present disclosure relates to a system and method for providing avatars adaptable to multiple environments.

In an aspect, the system and method enables data about a single avatar to be adapted and re-rendered in a virtually unlimited number of ways. This is achieved by generating data about an avatar's discrete facial and bodily features, and each feature's relative position to another, for the purpose of rendering different versions of that avatar which are visually adapted to suit multiple service environments.

This allows a service provider to reap the benefits of providing users with avatars that visually match its service environment, while relieving the user of the requirement to create a separate avatar specifically for that service.

Avatars are typically designed and intended for use in a bounded environment, such as a web portal, branded application or website, or video game. Avatars in each service environment may have a distinct look and feel, and services that use avatars may not want to allow sharing of their avatars for use in other environments.

To address the need for each environment to maintain its own look and feel, and simultaneously eliminate the time and effort required of users to create a new avatar in each environment, the present system and method reduces an avatar to a data set of components, which may be used to re-render a different version of that avatar matched to the look and feel of another environment. This effectively adapts the avatar into something new in each environment, while the use of a common data set of components provides a consistency between different versions of the avatar in different environments.

An adaptable avatar designed to be location and appearance-agnostic benefits an environment by automatically customizing an avatar that is appropriate to its look and feel, and provides the user with control over a consistent set of components for personalized avatars across multiple environments.

Various aspects of the present system and method will now be described in more detail with reference to the figures.

Referring to FIG. 1 an example of the implementation of the present invention is illustrated, as a computer network implemented system. It should be understood that FIG. 1 illustrates only one possible computer network architecture for implementing the present invention, but the invention is not limited to the particular implementation shown in FIG. 1.

FIG. 1 illustrates a first environment A linked to a server computer (10) and a second environment B linked to a server farm (12). In the implementation shown in FIG. 1, environment A acts as a host environment or service environment for enabling an avatar (14) to be rendered in one or more other environments, in this case second environment B. Server computer (10) is linked to a server application (16) that includes an avatar composition utility (18). The server farm (12) may also include an application repository (13). Linked to the application repository (13) is an Application Programming Interface (17) or "API". The avatar composition utility (18) allows one or more authorized users of the first environment A to create the avatar (14), following the workflow explained in greater detail below. The avatar (14) is rendered using a data set of components (22). The data set of components (22) is stored to a database (24). The second environment B may include for example a web presentment utility (26) that presents a series of Internet pages, based on one or more requests of a user via a browser (not shown). One or more of the requests may relate to presentment of an avatar, one or more operations involving an avatar, or online context for the avatar, as determined by the web presentment utility (26), including based on one or more applications linked to the server farm (12). These requests are received by the API (17), and optionally the API (17) interprets these requests so as to generate and communicate to the server computer (10) a request (28) that is actionable by the server computer (10). As explained below, the request (28) may include information for authenticating the request (28) as being associated with the user, by providing for example authentication data for the user. The server computer (10) acts on the request (28) by interpreting the request (28) and based on this interpretation accessing relevant portions of a profile (30) associated with the user, which includes or is linked to the data set of components (22). The relevant portions of the profile (30) will consist of those portions that are responsive to the request (28) in that they contain the information required for the second environment B to render the avatar (14), using the API (17), so as to present the avatar (14) in a way that complies with the attributes of the presentment of the avatar (14), the one or more operations involving an avatar (14), or online context for the avatar (14), required by the second environment B.

In this way, the avatar (14) is rendered to the second environment B in a responsive and contextually relevant way, without the need to deploy substantial infrastructure on at the server farm (12), i.e. only the API (17) is required.

Avatars may be created from avatar data saved or maintained by a computing device 100. FIG. 2 shows a table illustrating non-limiting examples of avatar components. An avatar component may be described by a component field and corresponding avatar component data. As shown in FIG. 2 the avatar components may be given a hierarchical structure that supports the selective extraction of features based on requests from the API, as described above, the organization of data components in different types some of which may constitute primary and secondary elements or features. In one implementation primary features may be persistent while secondary features may be more likely to be filtered out in favor of use of a feature associated with an on line environment. This file structure enables the mixing of features from the avatar component data and avatar components of a different online environment so as to adapt the avatar to the different online environment.

Avatar components are combined to form an avatar using an avatar composition utility. Operation of the avatar composition utility is illustrated (FIG. 3). Avatar components may be generated by a service environment (referred to as "Environment A"), and avatar component data may be assigned to each component, such as a component's category name, category type, gender, subcategory name, and state. A component's category name may refer to hairstyle, eyes, nose, jaw, mouth shape, etc. A component's category type may indicate whether the component is a primary avatar component or secondary avatar component. A component's gender may indicate whether the component is for male avatars, female avatars, or for either gender. A component's subcategory name may provide further categorization of the component. A component's state may provide contextual or situational information about the component's appearance. For example, a component may be assigned the category name "mouth", category type "primary", gender "either", subcategory "thin", and states "smiling" and "open". Other avatar component data may be assigned to each component, such as a filename and ID. Together, all avatar components comprise an avatar dataset. Avatar datasets may be stored on a computer server and may be made accessible to one or more third party service environments through an Application Programming Interface ("API"). A third party environment may be referred to as "Environment E" throughout this specification.

Each of the service environments may operate on a respective computing device (e.g. a computer server) or be associated with a respective computing device. Each service environment may also be associated with or operate on a single computing device, in the case of a videogame console or personal computer operating multiple games or applications locally. Each service environment may define its own avatar definitions and requirements. For example, while Environment A may require avatar components related to the avatar's face and body, Environment E may only require avatar components related to the avatar's face.

Avatars may be created locally on a particular computing device for a service environment, and then transmitted to a computer server configured with operating or maintaining some aspects of the service environment. The computer server may maintain each avatar dataset created in this way, and make avatar datasets, or data derived therefrom, available to other service environments operating either on the same computer server, or on a different computing device.

Now referring to FIGS. 3a, 3b, 3c, and 3d, shown is a possible embodiment of the avatar composition utility, and a possible workflow enabled by this utility. An avatar composition utility may present avatar components to a user, which the user may individually or collectively select and then customize by repositioning and resizing and choosing colors.

FIG. 3a shows a menu of icons representing lists of different avatar components that a user can select from, such as hair, eyes, body shape and clothing. Each list may include categories and subcategories of components. In FIG. 3a, a user can select subcategories such as long hair and straight hair to view and select from a list of all avatar hairstyles with long and straight hair. When a user selects a particular component, it is added to the user's avatar profile in the form of avatar data, including the component's ID, and applicable category, subcategories, state, color, etc.

Figure 3B:
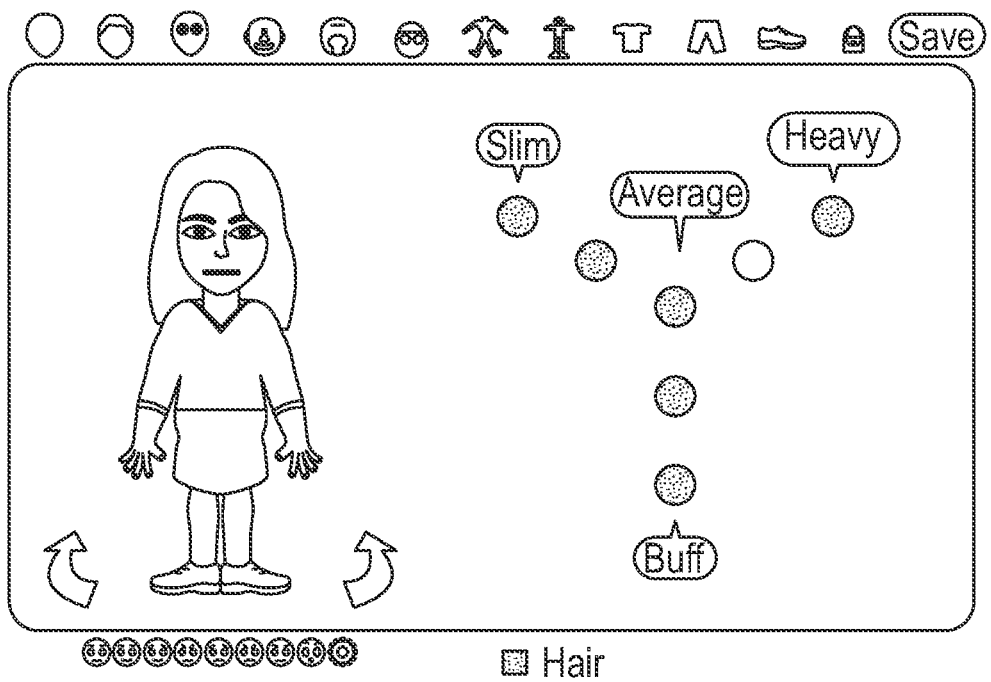

FIG. 3b shows a further aspect of the avatar composition utility, namely a tool to select different body shape components, such as slim, heavy, buff and average. When a user selects a particular body shape component, it is added to the user's avatar profile in the form of avatar data, including the component's ID, and applicable category, subcategories, state, color, etc.

Figure 3C:
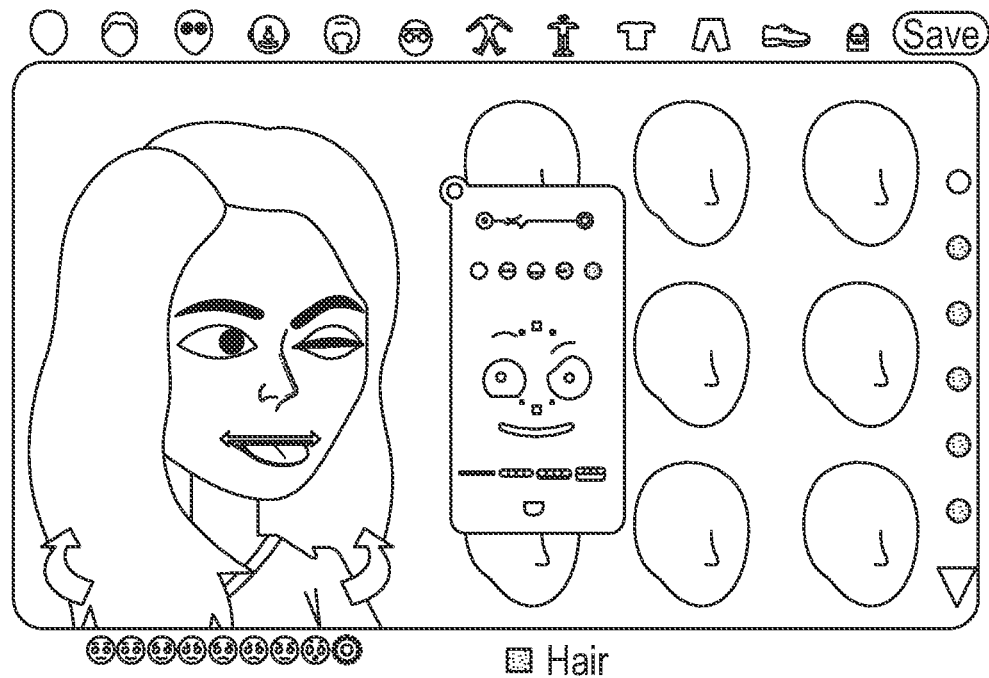

FIG. 3c shows a further aspect of the avatar composition utility, in which users may access a menu for selecting avatar state data. For example, the avatar's states include left eye component equal to mad and closed, left eyebrow equal to mad, right eye equal to happy and open, right eyebrow equal to happy, mouth equal to smiling and open, tongue equal to out, etc. When selected, these states are individually added to the user's avatar profile, and collectively added as avatar emotion data, such as happy or joking.

Figure 3D:
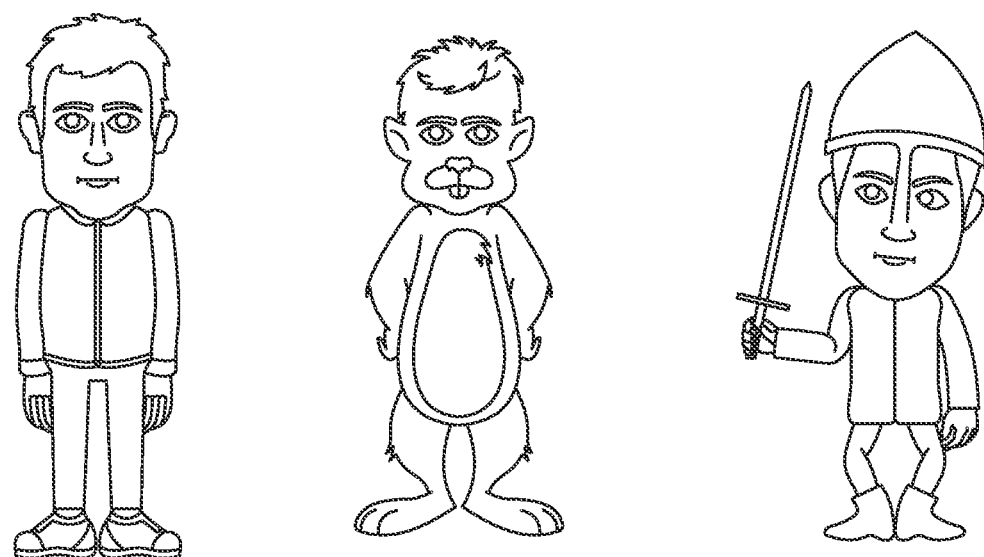

FIG. 3d illustrates the adaptive features of the present invention. It shows different versions of the same avatar, as created and then adapted using the present invention. The avatar on the far left may be the original avatar, and then on the right are two different versions, each being adapted in separate environments with access to the same avatar data. The avatar in the middle has components that correspond to the original avatar on the far left, rendered with its own avatar components in its own visual style, such as hairstyle and eye color, mapped using the system's API. Some components of the middle avatar do not have corresponding components in the original avatar, such as fur color and the snout. In this instance, these components have been mapped to other components in the original avatar: fur color has been mapped to skin tone and snout has been mapped to nose. The result is an adapted avatar with the appearance of a different species, yet individually adapted features that combine to retain the essence of the original avatar. The avatar on the far right has components that correspond to the original avatar on the far left, rendered with its own avatar components in its own visual style, such as hair length, hair color, eye color, skin tone and face shape, mapped using the system's API. Examples of components that have not been mapped include avatar height and component states. However, avatar emotion data has been mapped so that the original avatar profile can communicate through the API whether the avatar is happy, sad, etc., and the adapted avatar can update with the appropriate changes. The avatar also includes new components not present in the original avatar, such as sword and helmet, and new body proportions such as oversized head.

The avatar composition utility may embody one or more user workflows for guiding a user through the steps involved in creating an avatar, or modifying an existing avatar. The avatar composition utility may also access one or more avatar templates or "types", where each template or type constitutes a collection of components which may be organized hierarchically into component categories and component sub-categories. These components may relate to visual components of the avatar, as described above.

Figure 4:
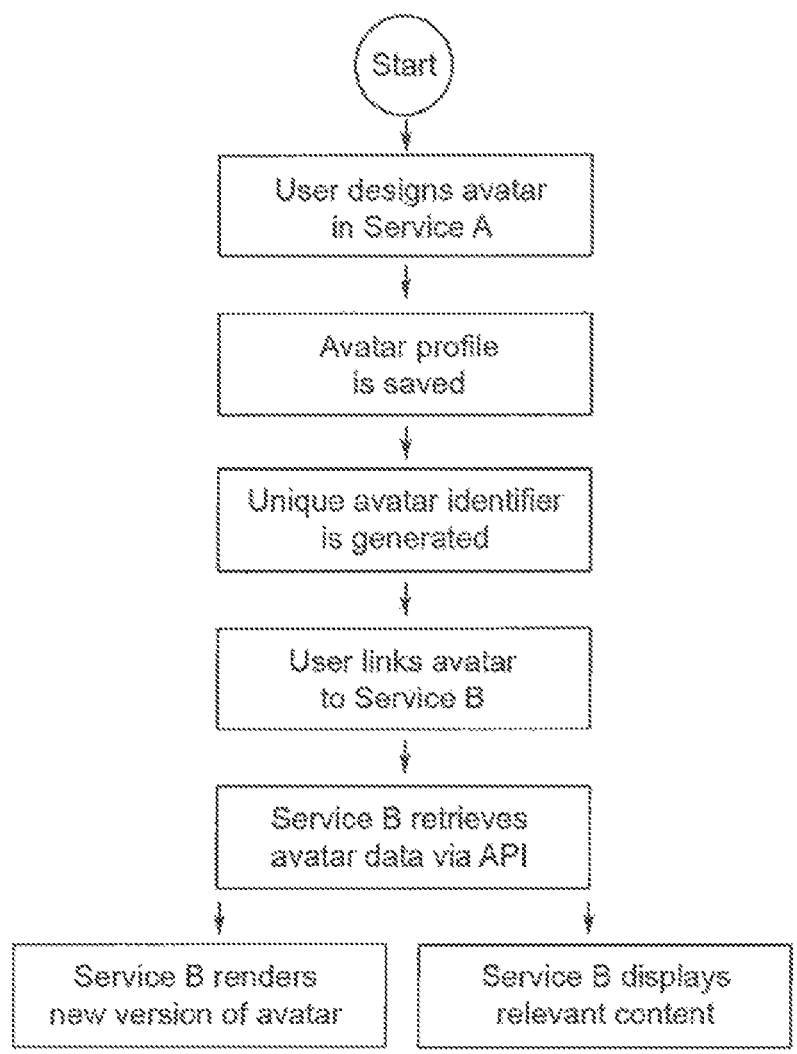
FIG. 4 is workflow diagram illustrating a possible embodiment of the method of the present invention.

A representative workflow in accordance with the method of the present invention is shown in FIG. 4.

In another embodiment, the avatar composition utility defines a series of avatar composition rules that may include, for example, minimum requirements for composing an avatar, so as to ensure that minimum rules for establishing an avatar data set to render an avatar in multiple environments are also met.

The user may save the avatar based on the selected components. If the user is saving the avatar for the first time, the system generates and saves a unique alphanumeric avatar ID and an "avatar profile". An avatar profile includes avatar component data corresponding to each selected component as shown in FIG. 2, additional avatar component data that defines component customizations, such as a component's selected color, size, shape, and relative positioning on the avatar, and "avatar emotion data", which is a code that is generated based the avatar's selected combination of states. For example, if the selected states include eyes=state_1, mouth=state_2, tongue=state_2 and body=state_3, the code assigned to that combination of avatar emotion data may indicate that the avatar is "hungry".

Additional avatar component data such as the size and relative positioning of components helps further distinguish one avatar and avatar profile from another, making both the original and any adapted forms of the avatar more unique and recognizable. Avatar emotion data is useful in demonstrating the avatar's personality and emotional or physical state.

Additional avatar components may be defined by the computing device 100 and saved as avatar data by defining a corresponding avatar component. In particular, non-visual data or meta data associated with a respective avatar may also be stored in the avatar dataset in this way, including data related to an emotion, experience, activity, or other non-visual characteristic. Accordingly, not all avatar components in an avatar dataset are intended to be displayed or will be displayed when rendering the avatar in a service environment. However, avatar components not rendered may be used by the service environment to modify other aspects of a display, or to modify the display of other avatar components. For example, an avatar component storing avatar component data representing that the user has participated in an activity, witnessed an event, completed a task, or used the avatar for a particular number of hours, may cause the service environment to display a representative icon, a title, or change the appearance of the avatar to appear stronger, tired, or in other ways.

The avatar ID generated by the system may be displayed to the user, or the user may create a unique username that corresponds to the ID. The avatar profile may further include an identification of a user associated with the avatar, either in the avatar ID itself or separately.

Avatar profiles are stored in a server database and may be made accessible to Environment E through an API. As the avatar designed by the user for Environment A may by stored in a proprietary data format or may include proprietary avatar components, Environment A may be configured to derive and store a "universal" dataset for each avatar based on the avatar dataset. The universal dataset may be stored in a format usable by Environment E for generating a subsequent avatar. Alternatively, the API may provide for any required format conversions on demand upon receiving a request from Environment E for a particular avatar dataset, or avatar component associated with a particular user.

An Environment E may access Environment A's avatar dataset through Environment A's API for the purpose of generating and mapping Environment E's avatar components with Environment A's. Environment E can ask Environment A for its entire dataset, including every individual component and corresponding avatar component data, and then generate any or all components in its own style. Environment E can ask Environment A only for particular subsets of information, such as all avatar components and avatar component data with gender equal to female, for the purpose of, for example, generating its own female-only avatars; or Environment E can ask Environment A only for all subcategories of all categories, for the purpose of, for example, generating one simplified hairstyle to correspond to each subcategory. Environment E may also map each avatar component it generates to corresponding avatar component data in Environment A by adding relevant identifying tags to each component.

In one embodiment of the present invention, the API may be accessed through an avatar data mapping utility (not shown). Such a utility may include a graphical user interface which displays available avatar components and avatar data generated by Environment A. Environment E can generate its own corresponding avatar components in its own style, and then upload, or drag-and-drop, each component beside Environment A's corresponding avatar components. Each matched component automatically generates a relevant identifying tag, which Environment E can export and then use to generate adapted avatars when users connect their avatars from Environment A to Environment E. As above, Environment E may generate and map components to each of Environment A's components, only some components, or only subsets of components. Such a visual utility simplifies and speeds the process of generating and mapping avatar components and data between environments.

In instances where there is no corresponding component in Environment A, a component may be mapped to an arbitrary parallel component. For example, if an avatar in Environment E has the appearance of a cartoon hedgehog, avatar skin color data in Environment A may be mapped to fur color, and avatar clothing data may be discarded. Instead of requesting the entire avatar dataset for a particular identifier, Environment E may request only avatar component data supported by Environment E. Environment E may also request only one or more avatar components from the API. Accordingly, any request from Environment E may specify the avatar component data requested in addition to including identification data. The identification data may identify a particular avatar by avatar identifier, or may include other data or identifiers associated with a particular user, such as name or email address.

A user may enter Environment E and see an option to connect avatar saved in Environment A to Environment E. User enters unique avatar ID or username and password created in Environment A. Environment E sends avatar ID and password to Environment A via API. Environment A then authenticates identity of user. Environment E requests user's avatar component data from Environment A via API, and Environment A sends requested avatar component data. Environment E can ask Environment A for a user's complete avatar profile, or only for avatar component data from that profile that is relevant to Environment E's avatars. For example, Environment E may only require a user's avatar body shape, skin color and hair color, or only require a user's avatar eye color and emotion data. This way, Environment E can choose to automatically modify, adapt, replace or remove any of the user's avatar components. After Environment E receives the requested avatar component data, it generates an adapted version of the user's avatar consisting of Environment E's relevant avatar component data and presents this adapted avatar to the user.

Environment E may offer the user further avatar customization options using its own avatar composition utility, allowing the user to modify existing avatar components, or add new avatar components not present in Environment A, such as accessories, clothing, weapons, etc. The user may save the adapted avatar in Environment E, and Environment E may generate a new avatar profile of the adapted avatar. The avatar profile of the adapted avatar in Environment E may then be sent to Environment A through the API, and Environment A may then make relevant updates to the user's avatar profile in Environment A, such as modifications to hairstyle or additions of new avatar components.

In an embodiment, the present system and method includes an application programming interface or API which may be integrated with a third party service provider's online environment. For example, in one possible implementation, the API may embody programming required to enable the use of the avatar profile to populate the third party online environment with the avatar, or to generate an avatar derivative based on the base avatar profile, and then populate the third party online environment with the resulting derivative avatar. As another illustrative example, the API may include a translator that is operable to translate the avatar profile into a set of instructions that may be processed by the systems associated with the third party online environment to populate the avatar or derivative avatar into the third party online environment.

The creation of avatars that are adaptive and responsive to different online environments and can move seamlessly from one online environment to another online environment provides the possibility of creating a stronger connection between the user and his/her avatar, because the avatar with a common set of components becomes strongly identifiable by the user. In an embodiment, this connection with the user can be leveraged for the purpose of a variety of user engagement scenarios that may bring value to an avatar platform as well as its various participating partners.

By adapting an existing avatar to multiple service environments, it may be possible to reduce the amount of time spent by a user creating or modifying avatars in each environment, which may be referred to as "onboarding" time. New digital applications are being created or modified regularly, each with their own onboarding tasks, including creating user profiles or avatars. While often necessary, creating multiple user profiles across multiple applications is very time consuming. A single application to create, update and manage an adaptable avatar across multiple other applications and platforms would save users time versus creating and updating different avatars for each environment. For example, a user may register for a banking application that shows the user's avatar's mood based on each month's personal spending, a music application that shows the user's avatar dancing whenever music plays, and a video game where the user's avatar has the appearance of a robot. Creating an adaptable avatar once and then connecting to it from each of the three applications would be 75% faster than creating avatars separately in each service; connecting to 10 such applications would be over 90% faster, and so on. For application providers, giving users the option to connect to their adaptable avatars results in faster and simpler onboarding.

Adaptable avatars may assist in establishing a unifying user experience across disparate applications. Each computer software application or service environment may serve a different purpose and may include some necessary differences in features and user interface. Nevertheless, the user of such environments remains a single person, and so the experience of switching between environments can feel disjointed and lack continuity. A personalized and recognizable avatar that may be adapted to fit other contexts helps to establish consistency between otherwise disparate environments. The resulting user experience may feel more harmonious and unified. For example, switching between a location-sharing application and a health-monitoring application while seeing essentially the same avatar gives these very different applications a source of continuity, making the user's overall digital experience feel more seamless. As applications evolve and new ones are introduced, an adaptable and easily updatable avatar also provides users continuity through time.

The present invention promotes for example environments that are based on collaboration between different online operators who may collaborate to provide a single online environment. The system and method provides the ability for an avatar to be rendered seamlessly across multiple associated environments.

Adaptable avatars may increase the relevance of an application to a user. An application may be more useful when the user experience is personalized. An application that does not use avatars, or that uses non-personalized avatars, may be missing a visual cue for making the application and its features personally relevant to users. Allowing users to connect un-adapted portable avatars might add some relevance to the user experience, but it risks creating an unacceptably inconsistent experience because the avatars are not properly contextualized. For example, a weather forecasting application might tell the user how to dress on a given day by showing a generic avatar wearing appropriate clothing, on a warm and rainy day, the avatar might appear in the application wearing a T-shirt and shorts and holding an umbrella. An improvement might be to give the user an option to connect and import an existing un-adapted avatar from another application, but this would make the user experience visually fragmented. Still another improvement might be to give the user the option to create a new avatar from scratch within the application, but this would add a time-consuming customization task and give the user an additional avatar to manage. If such an application integrated with an adaptable avatar system, the user would only need to connect a previously made avatar to the application to see a contextualized version of him- or herself appear in the weather forecast automatically, thereby making it much more personally relevant. For the application provider, each adaptable avatar becomes an immediate and familiar-looking common connection between itself and the user.

Adaptable avatars may increase user engagement in a particular application. Two challenges faced by most applications are initially grabbing users' interest, and then establishing a pattern of behavior so that they become engaged, habitual users. Adaptable avatars provide an ideal mechanism for establishing such user interest and engagement. Users build an affinity for their adaptable avatars through repeated and varied use in multiple applications. Consequently, serving a pre-existing, yet adapted, avatar of a user within the context of a new application may make that application more interesting to the user than applications where either the avatar needs to be created from scratch and therefore has no history with the user, or is previously designed by the user in another application but not adapted. For example, a video game set in a different galaxy might allow a user to connect a pre-existing adaptable avatar, and then automatically generate a new adapted alien version that captures the original avatar's essence by retaining appropriate components, such as eye color, skin tone, and face shape, etc. Presenting such an adapted avatar at the start of the game provides a vehicle for instantly capturing the user's attention and immersing the user in the game. All applications that use an adaptive avatar system become collectively more engaging by giving users a single, unifying visual identity that transcends any one application, thus making the entire digital experience personally meaningful and satisfying as a whole.

Figure 5:
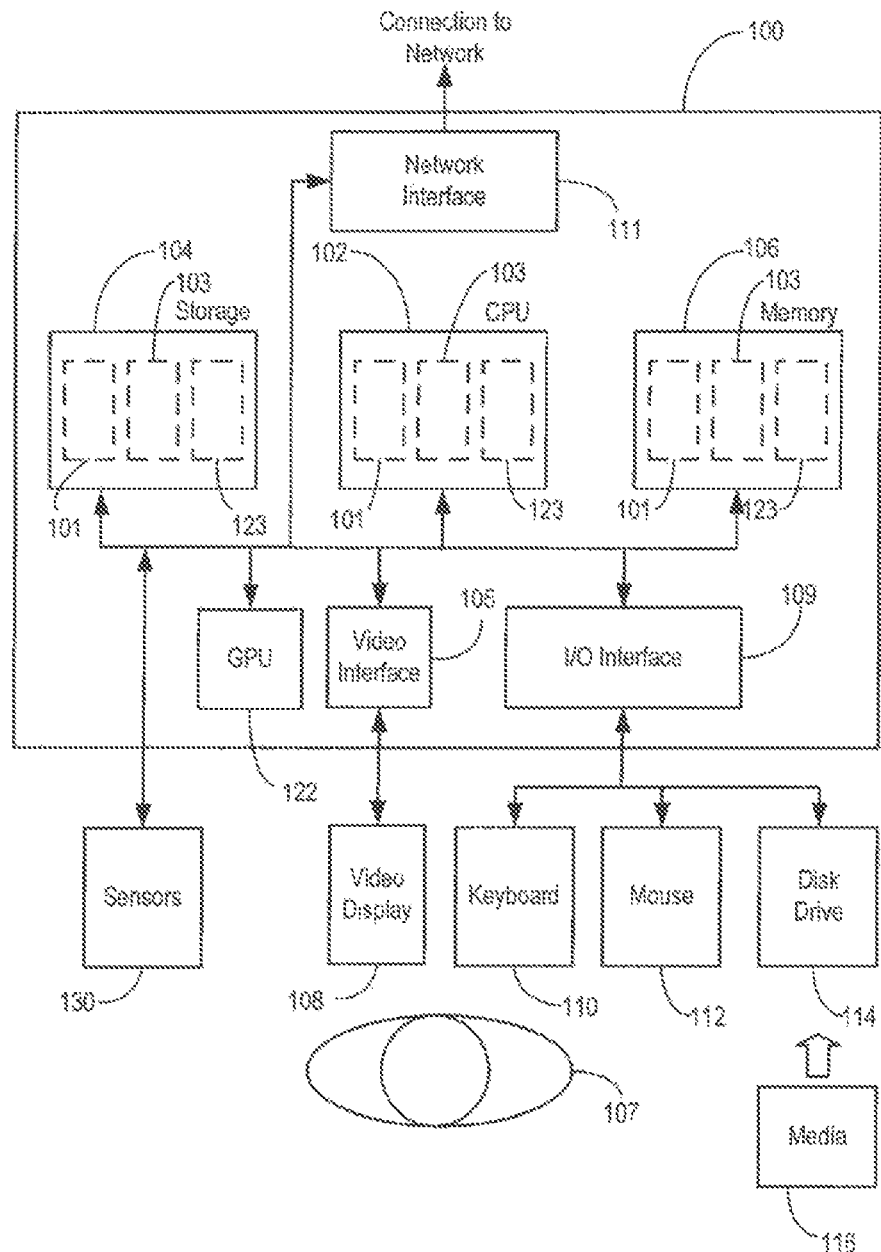
FIG. 5 illustrate a generic computer system which may provide a suitable operating environment for various embodiments.

Referring to FIG. 5, the present system and method may be practiced in various embodiments. A suitably configured generic computer device, and associated communications networks, devices, software and firmware may provide a platform for enabling one or more embodiments as described above. By way of example, FIG. 4 shows a generic computer device 100 that may include a central processing unit ("CPU") 102 connected to a storage unit 104 and to a random access memory 106. The CPU 102 may process an operating system 101, application program 103, and data 123. The operating system 101, application program 103, and data 123 may be stored in storage unit 104 and loaded into memory 106, as may be required. Computer device 100 may further include a graphics processing unit (GPU) 122 which is operatively connected to CPU 102 and to memory 106 to offload intensive image processing calculations from CPU 102 and run these calculations in parallel with CPU 102. An operator 107 may interact with the computer device 100 using a video display 108 connected by a video interface 105, and various input/output devices such as a keyboard 110, mouse 112, and disk drive or solid state drive 114 connected by an interface 109. In known manner, the mouse 112 may be configured to control movement of a cursor in the video display 108, and to operate various graphical user interface (GUI) controls appearing in the video display 108 with a mouse button. The disk drive or solid state drive 114 may be configured to accept computer readable media 116. The computer device 100 may form part of a network via a network interface 111, allowing the computer device 100 to communicate through wired or wireless communications with other suitably configured data processing systems (not shown). The generic computer device 100 may be embodied in various form factors including desktop and laptop computers, and wireless mobile computer devices such as tablets, smart phones and super phones operating on various operating systems. It will be appreciated that the present description does not limit the size or form factor of the computing device on which the present system and method may be embodied.

Use Cases

As will be appreciated, the present system and method may be adapted for various use cases. For example, the present system and method may be used to link a user's avatar ID and avatar profile to websites and have their unique versions of a user appear automatically. A user's avatar ID and avatar profile may also be linked to a video game to play as a re-rendered version of the user's avatar in that game's world. Alternatively, the system of the present invention may be linked to a social networking platform, and sign in to the social networking using social networking login information.

The system of the present invention may be configured to extract information relevant to a user to add context to the rendering of the avatar. For example, the system may connect to social media channels in order to extract information regarding the interests of a user, topics or themes of current interest to the user, and so on. This information may be used to adapt content including avatars, as explained herein.

In another use case, the system and method may automatically render different versions of avatars for different occasions or branding purposes. For example, the avatar can automatically turn into a zombie on Halloween, or be modified by clothing or features to represent a popular character in a show.

In another use case, the system and method may be used to improve digital advertising and web technical support by presenting complementary avatars based on a user's avatar component data. The system and method can also improve user profiling by compiling a user's physiological avatar data, such as height and body shape, behavioral avatar data, such as past and current body poses and postures, and emotional history based on past and current avatar emotion data, across multiple environments.

In another use case, the system and method may be used to improve digital advertising by presenting the user's avatar in online advertisements. The system and method may also be used to improve advertising targeting by using avatar component data to glean physiological information, such as height and body shape, or emotional state based on current or historical avatar emotion data, to serve more relevant ads.

In another use case, the system and method can improve content targeting by using avatar component data to glean physiological information, such as height and body shape, or emotional state based on current or historical avatar emotion data, to serve more relevant news, stories, games and videos.

In another use case, users' avatar data may be categorized in aggregate to ascertain distributions in user physiological, behavioural, emotion and other data within and between populations. Aggregate data may be used to correlate avatar data with other digital user activities, such as online shopping and content consumption. Historical and current aggregate data may also be used to build predictive models for real-world activities, such as economic and sociological trends.

In another use case, the system and method can improve personalized content and storytelling by presenting different versions of a user's avatar in custom comics and animation.

In another use case, the system and method may provide branded personalized emoticon packs featuring a user's avatar to represent a particular theme or particular well-known character.

In another use case, the system and method can present custom versions of a user's avatar in e-greeting cards.

In another use case, the present system and method can present custom versions of a user's avatar in different outfits based on body data.

These various use cases may be adapted to virtually any type of media or digital environment.

While illustrative embodiments of the invention have been described above, it will be appreciated that various changes and modifications may be made without departing from the scope of the present invention.

In further aspects, the disclosure provides systems, devices, methods, and computer programming products, including non-transient machine-readable instruction sets, for use in implementing such methods and enabling the functionality described previously.

Although the disclosure has been described and illustrated in exemplary forms with a certain degree of particularity, it is noted that the description and illustrations have been made by way of example only. Numerous changes in the details of construction and combination and arrangement of parts and steps may be made. Accordingly, such changes are intended to be included in the invention, the scope of which is defined by the claims.

Except to the extent explicitly stated or inherent within the processes described, including any optional steps or components thereof, no required order, sequence, or combination is intended or implied. As will be will be understood by those skilled in the relevant arts, with respect to both processes and any systems, devices, etc., described herein, a wide range of variations is possible, and even advantageous, in various circumstances, without departing from the scope of the invention, which is to be limited only by the claims.

What is claimed is:

1. A system comprising:
a processor;
a graphical user interface coupled to the processor, the graphical user interface comprising an input device and a display screen; and
memory coupled to the processor and storing instructions that, when executed by the processor, cause the system to perform operations comprising:

receiving, via the input device of the graphical user interface, selection of a first avatar dataset comprising a first plurality of avatar components associated with a first user;

extracting information regarding an interest, a topic or a theme associated with the first riser from a social networking platform;

modifying the first plurality of avatar components in the first avatar dataset based on the information regarding the interest, the topic or the theme associated with the first user;

retrieving, from a computing device associated with a second user, a second avatar dataset comprising a second plurality of avatar components associated with the second user, wherein the first user is different from the second user, wherein the second avatar dataset is retrieved from the computing device associated with the second user over an application programming interface;

modifying the second plurality of avatar components in the second avatar dataset;

generating a first avatar based on the first avatar dataset;

generating a second avatar based on the second avatar dataset; and displaying, on the display screen of the graphical user interface, the first avatar and the second avatar.

2. The system of claim 1, wherein an avatar component from the second avatar dataset includes one or more of: a category name, a category type, a gender, a subcategory name, and a state.

3. The system of claim 2, wherein retrieving the second avatar dataset from the computing device associated with the second user includes retrieving a subset of a total number of available avatar components stored on the computing device based on the subset of avatar components each having a common characteristic, the common characteristic including one or more of: an identical category name, an identical category type, an identical gender, an identical subcategory name, and an identical state.

4. The system of claim 1, wherein retrieving the second avatar dataset includes performing a format conversion on the second avatar dataset via the application programming interface.

5. The system of claim 1, wherein the memory further stores instructions for causing the system to perform operations comprising:
displaying at least a portion of the first plurality of avatar components and at least a portion of the second plurality of avatar components together on the display screen of the graphical user interface;
receiving, via the input device of the graphical user interface, a selection of an avatar component from the plurality of displayed avatar components;
generating a first adapted avatar based on the first avatar and the selected avatar component;
generating a second adapted avatar based on the second avatar and the selected avatar component; and
displaying, on the display screen of the graphical user interface, the first adapted avatar and the second adapted avatar.

6. The system of claim 5, wherein modifying the first avatar includes one or more of: displaying an icon with the first avatar, displaying a title with the first avatar, and changing an appearance of the first avatar.

7. The system of claim 6, wherein changing the appearance of the first avatar includes one of: changing the appearance of the first avatar to appear stronger, or changing the appearance of the first avatar to appear tired.

8. The system of claim 1, wherein the memory further stores instructions for causing the system to perform operations comprising:
determining that the first user and the second user participated in an activity;
modifying the first avatar and the second avatar in response to determining the first user and second user participated in the activity; and
displaying the modified first and second avatars on the display screen of the graphical user interface.

9. The system of claim 1, wherein retrieving the second avatar dataset includes mapping an avatar component in the second avatar dataset to an avatar component in the first avatar dataset.

10. The system of claim 9, wherein mapping the avatar component in the second avatar dataset to the avatar component in the first avatar dataset includes discarding one or more avatar components from one or more of:
the first plurality of avatar components, and the second plurality of avatar components.

11. The system of claim 1, wherein displaying the first avatar and the second avatar includes displaying the first avatar and the second avatar within a video game.

12. The system of claim 1, wherein displaying the first avatar and the second avatar includes displaying the first avatar and the second avatar on a social networking platform in communication with the system.

13. The system of claim 1, wherein displaying the first avatar and the second avatar includes displaying the first avatar and the second avatar within a messaging application.

14. The system of claim 1, wherein displaying the first avatar and the second avatar includes displaying the first avatar and the second avatar within one or more of a custom comic and a custom animation.

15. The system of claim 1, wherein displaying the first avatar and the second avatar includes displaying the first avatar and the second avatar within a group of personalized emoticons.

16. The system of claim 1, wherein displaying the first avatar and the second avatar includes displaying the first avatar and the second avatar within an e-greeting card.

17. The system of claim 1, wherein displaying the first avatar and the second avatar includes modifying an outfit for the first avatar and an outfit for the second avatar based on body data for the first user and body data for the second user.

18. A computer-implemented method comprising:
receiving, by a processor of a first computing device via an input device, selection of a first avatar dataset comprising a first plurality of avatar components associated with a first user;
extracting information regarding an interest, a topic or a theme associated with the first user from a social networking platform;
modifying the first plurality of avatar components in the first avatar dataset based on the information regarding the interest, the topic or the theme associated with the first user;
retrieving, by the processor from a second computing device associated with a second user, a second avatar dataset comprising a second plurality of avatar components associated with the second user, wherein the first user is different from the second user, wherein the second avatar dataset is retrieved from the second computing device over an application programming interface;

modifying, by the processor, the second plurality of avatar components in the second avatar dataset;

generating, by the processor, a first avatar based on the first avatar dataset;

generating, by the processor, a second avatar based on the second avatar dataset; and displaying, by the processor on a display screen, the first avatar and the second avatar.

19. A non-transitory computer-readable medium storing instructions that, when executed by a first computer system, cause the first computer system to perform operations comprising:

receiving, via an input device, selection of a first avatar dataset comprising a first plurality of avatar components associated with a first user;

extracting information regarding an interest, a topic or a theme associated with the first user from a social networking platform;

modifying the first plurality of avatar components in the first avatar dataset based on the information regarding the interest, the topic or the theme associated with the first user;

retrieving, from a second computing device associated with a second user, a second avatar dataset comprising a second plurality of avatar components associated with the second user, wherein the first user is different from the second user, wherein the second avatar dataset is retrieved from the second computing device over an application programming interface;

modifying the second plurality of avatar components in the second avatar dataset;

generating a first avatar based on the first avatar dataset;

generating a second avatar based on the second avatar dataset; and displaying, on a display screen, the first avatar and the second avatar.

* * * * *

UNITED STATES PATENT AND TRADEMARK OFFICE
CERTIFICATE OF CORRECTION

PATENT NO. : 11,229,849 B2  
APPLICATION NO. : 15/401926  
DATED : January 25, 2022  
INVENTOR(S) : Blackstock et al.

Page 1 of 1

It is certified that error appears in the above-identified patent and that said Letters Patent is hereby corrected as shown below:

On the Title Page

On page 4, in Column 1, under item (56) "Other Publications", Line 52, delete "datd" and insert --dated-- therefor On page 4, in Column 2, under item (56) "Other Publications", Line 5, delete "2018 t"," and insert --2018",-- therefor On page 4, in Column 2, under item (56) "Other Publications", Line 34, delete "Jan. 30," and insert --Jan. 3,-- therefor In the Claims In Column 13, Line 6, in Claim 1, delete "riser" and insert --user-- therefor Signed and Sealed this  
Tenth Day of September, 2024

Katherine Kelly Vidal  
*Director of the United States Patent and Trademark Office*